United States Patent [19]
Wedin

[11] Patent Number: 5,178,511
[45] Date of Patent: Jan. 12, 1993

[54] AXIALLY MOUNTED IMPLEMENT CARRIERS

[76] Inventor: Donald S. Wedin, R.R. 2, Box 91, Camp Douglas, Wis. 54618

[21] Appl. No.: 855,300

[22] Filed: Mar. 23, 1992

Related U.S. Application Data

[63] Continuation-in-part of Ser. No. 650,901, Feb. 5, 1991, Pat. No. 5,106,253.

[51] Int. Cl.⁵ .................................. A01D 85/00
[52] U.S. Cl. ........................ 414/703; 414/24.5; 414/920; 414/697
[58] Field of Search .......... 414/24.5, 723, 703, 414/715, 686, 920, 706–710, 687, 718

[56] References Cited

U.S. PATENT DOCUMENTS

| | | | |
|---|---|---|---|
| 2,524,203 | 10/1950 | Mott | 414/699 |
| 2,725,995 | 12/1955 | Silbaugh | 414/686 |
| 4,099,629 | 7/1978 | Cox | 414/24.5 |
| 4,256,426 | 3/1981 | Buss | 414/24.5 |
| 4,275,985 | 6/1981 | Schremmer | 414/24.5 X |
| 4,306,825 | 12/1981 | Yilit | 414/24.5 |
| 4,318,653 | 4/1982 | Benefield et al. | 414/24.5 |
| 4,790,558 | 12/1988 | Ellis | 414/920 X |

FOREIGN PATENT DOCUMENTS

| | | | |
|---|---|---|---|
| 538923 | 4/1957 | Canada | 414/703 |
| 2511125 | 9/1976 | Fed. Rep. of Germany | 414/24.5 |
| 824241 | 11/1959 | United Kingdom | 414/703 |
| 1548029 | 7/1979 | United Kingdom | 414/24.5 |
| 2153337 | 8/1985 | United Kingdom | 414/24.5 |
| 2158804 | 11/1985 | United Kingdom | 414/920 |

*Primary Examiner*—Michael S. Huppert
*Assistant Examiner*—William M. Hienz
*Attorney, Agent, or Firm*—M. Paul Hendrickson

[57] ABSTRACT

The disclosure pertains to an attachment for use in attaching liftable implements onto transporting tractors equipped with a hydraulic driven power source. The attachment includes a pivotally mounted barrel, and a supportive carriage member which slideably reciprocates along the barrel. The elevational pitch of the barrel is controlled by the reciprocating movement of the carriage member. The carriage member includes mounting sites for axially mounting stabilizing braces and the hydraulic source onto the carriage member for stabilizing it against lateral movement while also permitting it to supportively reciprocate along the barrel. Three point hitch implements may be attached and carried by the attachment.

19 Claims, 8 Drawing Sheets

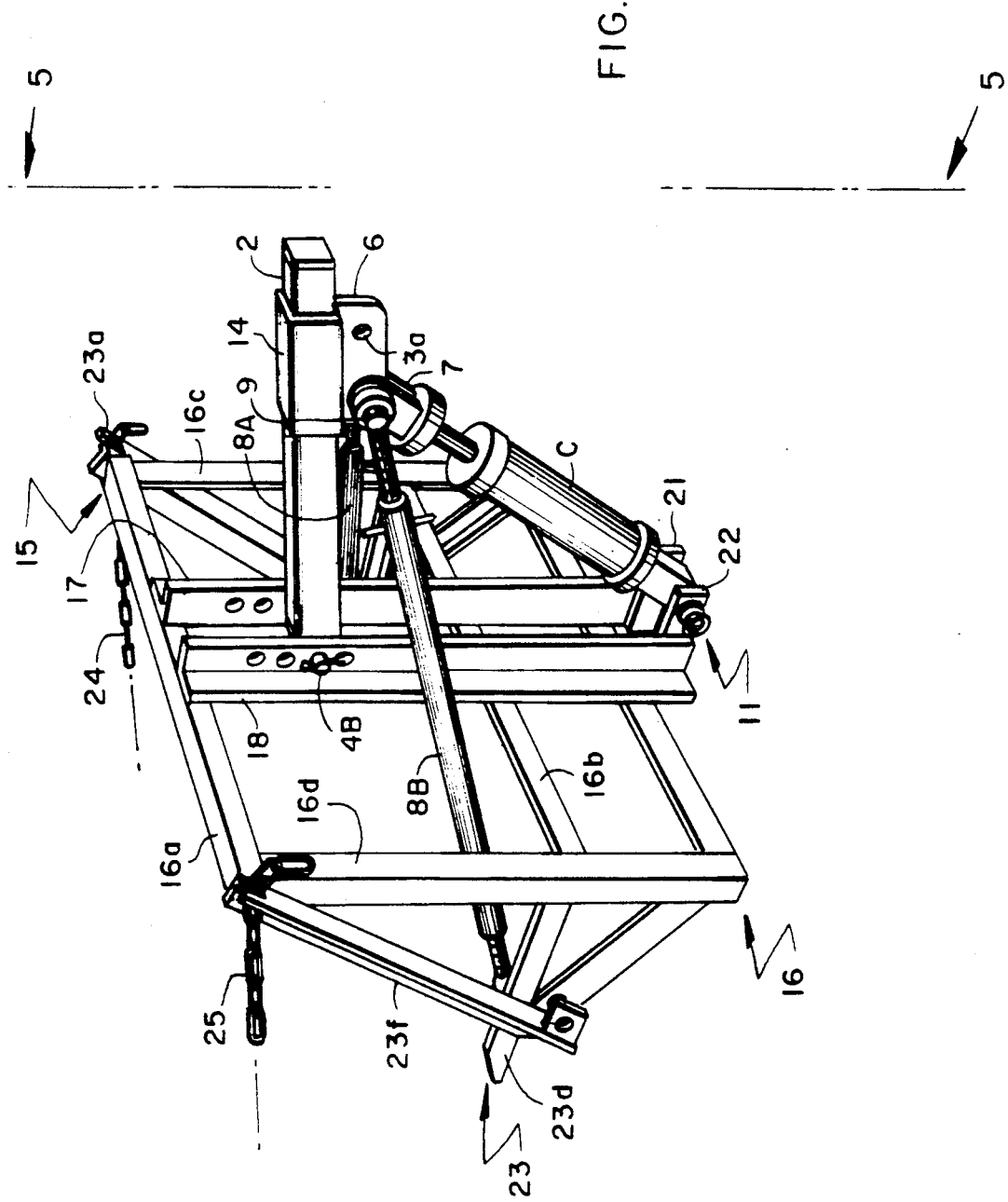

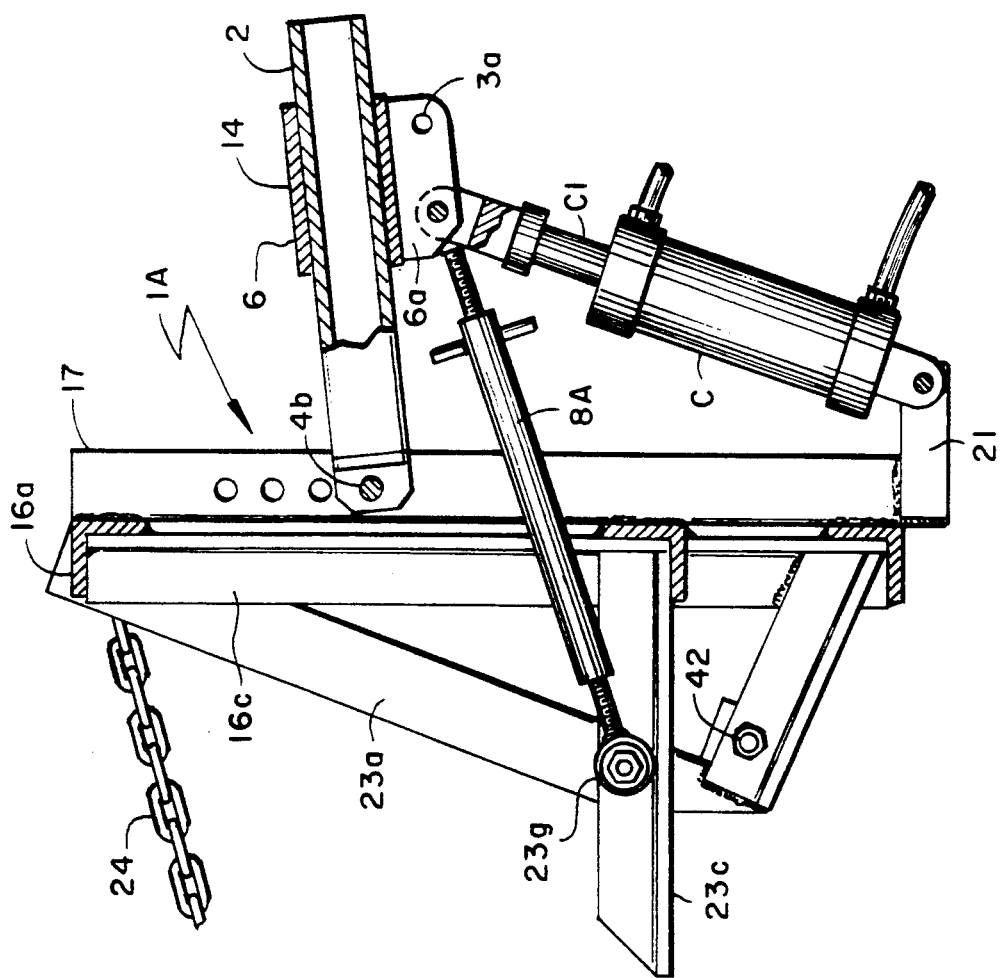

AXIALLY MOUNTED IMPLEMENT CARRIERS

This application is a continuation-in-part application to co-pending parent application Ser. No. 07/650,901 entitled Axially Mounted Bale Carriers, filed on Feb. 5, 1991 and now U.S. Pat. No. 5,106,253 by Donald S. Wedin as the applicant.

FIELD OF THE INVENTION

The present invention pertains to transporting devices and attachments, and more particularly to a liftable attachment carrier for use in combination with transporting vehicles.

BACKGROUND OF THE INVENTION

Within the farming industry, there is a need for a more effective carrier system for mounting rear and front-end mounted attachments or implements onto a farm tractor. Attachments or implements often mounted onto the rear and front-end of farm tractors include earthen and snow blades, fork and bucket carriers, lifts and other similar front-end mounted attachments. Unfortunately, such attachments are often unsuitable for use upon many farm tractors and especially amongst the smaller and older farm tractors. The attachments are also not generally universally adaptable for use upon the various types and models of farm tractors. The over-all design, functional efficacy, stability, cost and time of attaching or removing attachment from a tractor also leaves much to be desired in the traditional attachments.

Conventional attachments typically embody a number of mechanical limitations or drawbacks which generally restrict their utility to rather specific adaptations. For example, the transport of lifted heavy materials is often hazardous and especially when the transporting conditions approach or exceed the stability limitations of the transporting tractor. The bulk and weight of a lifted object can substantially alter and shift the gravitational center of the transporting tractor. This problem becomes particularly acute when the transport is conducted upon uneven or steep terrain with an undersized tractor. An abrupt or casual shift in weight may lead to tipping or up-ending of the tractor. Such problems substantially increase the hazardous perils of transport and especially when older modeled or small tractors are used as a transporting carrier.

Within the industry, the attachments are traditionally tailor-made for adaptation to a particular farm tractor type or model. Such attachments are generally custom fit to a specific tractor model. Most attachments are also targeted towards the larger tractors.

Attachments which would be readily attachable to the farm equipment while also minimizing capital expenses (e.g. tractor, equipment costs, etc.) could contribute towards a more efficient and profitable farm operation. An attachment of a universal adaptation to different farm tractor models of a wide front wheel type and which requires a minimum amount of time and effort for its attachment would further enhance farming efficiency and profitability. Further benefits to the farm producer would be realized if there were available a low cost attachment which could be effectively combined with an inexpensive and readily available power drive source (e.g. such as a farm hydraulic cylinder) to provide an inexpensive and effective primary or complementary power supply source for converting the older tractor models or types into a highly effective front-end mounted carrier. Further advantages would result if the attachment carrier would serve as a carrier and mount for a variety of implements.

SUMMARY OF THE INVENTION

The inventor, realizing the defects and limitations of the prior art attachments, created a rear and front-end mountable attachment which effectively overcomes the aforementioned defects and limitations. The present invention provides for a rear and front-end mounted attachment which effectively serves as carrier and mount for a variety of liftable implements carried by a conventional farm tractor.

The attachment includes an elongated rod or barrel terminated by a rod connector at one rod end. The rod connector is used to connect the rod to an axial mounting site which in turn allows the rod to radially pivot about its mounting site.

The rod is supported and slideably engages onto a carriage or carriage member equipped for linkage onto a power drive source for vertically adjusting the carriage and the slideably supported rod to the appropriate elevational level or pitch. The carriage includes one or more pivotal or axial mounting connectors which serve to mount lateral stabilizing braces and a power drive unit to the carriage member. The carriage also includes securing means for securing an attachable and detachable implement onto the carriage.

In the preferred embodiments of its use the attachment relies upon a conventional hydraulic cylinder as the drive means for powering the carriage to the desired elevational level. The carriage in its preferred embodiments includes a hydraulic cylinder connector for connecting the hydraulic cylinder to the carriage thus allowing for elevationally raising and lowering the carriage and the supported rod thereby. The attachment also in its preferred embodiments includes a pair of lateral braces which laterally extend outwardly in opposing directions from the carriage to a fixed and stabilizing connecting site so as to brace the carriage against lateral movement. The lateral braces are also preferably pivotally mounted to the carriage member (such as by a shaft) which permits the braces to radially pivot thereabout. The lateral braces are also pivotally anchored to a fixed anchoring site such as upon the tractor itself or a supportive frame anchored onto the tractor in such a manner so as to permit radial movement of the lateral braces about the anchoring site. The pivotal mounting of the lateral braces at both brace ends allows the braces to radially and concurrently move about their respective fixed axial connective sites as the carriage member is raised or lowered by the hydraulic cylinder. The braces may be anchored onto the tractor or by a separate frame affixed to the tractor so as to provide a fixed brace anchoring site about which the braces in cooperative association with the carriage member radially pivot. The braces, as previously mentioned, are also pivotally associated and connected to the carriage member so that the braces will radially move in cooperative and reciprocal association with the hydraulic cylinder movement. The stabilizing braces reciprocate about a curved radius fulcrummed about the carriage member as the hydraulic cylinder is raised or lowered to the appropriate elevational position.

When the attachment is used in combination with a hydraulic cylinder, such as those commonly fitted with terminal axial connective mounts at each cylinder end, one of the axial mounts is secured to the tractor or a supportive frame affixed to the tractor while other axial mount is connected to the carriage. In operation, the attachment thus includes a carriage member which slideably engages the rod and elevationally supports the rod at a desired elevated level. The pivotal movement of the lateral braces respectively at a proximate end to the tractor or support frame thereof and the pivotal anchoring at a distal end of the braces to the carriage member plus hydraulic cylinder pivotally mounting contribute towards a cooperative combination which retain the rod in a straight-forward projecting and stabilized relationship against lateral movement. The lateral braces pivotally mounted at their respective terminating ends, the hydraulic cylinder pivotal mount and the supportive and slideable engagement of the barrel thereto form a common arcuate relationship between components moving about the carriage as the rod is elevationally adjusted by the ram of the hydraulic cylinder.

BRIEF DESCRIPTION OF THE FIGURES

FIG. 4 is a perspective view of a front mounted attachment.

FIG. 5 is a cross-sectional view of the attachment taken along line 5—5 of FIG. 4.

DETAILED DESCRIPTION OF THE INVENTION AND ITS PREFERRED EMBODIMENTS

Figure 1:
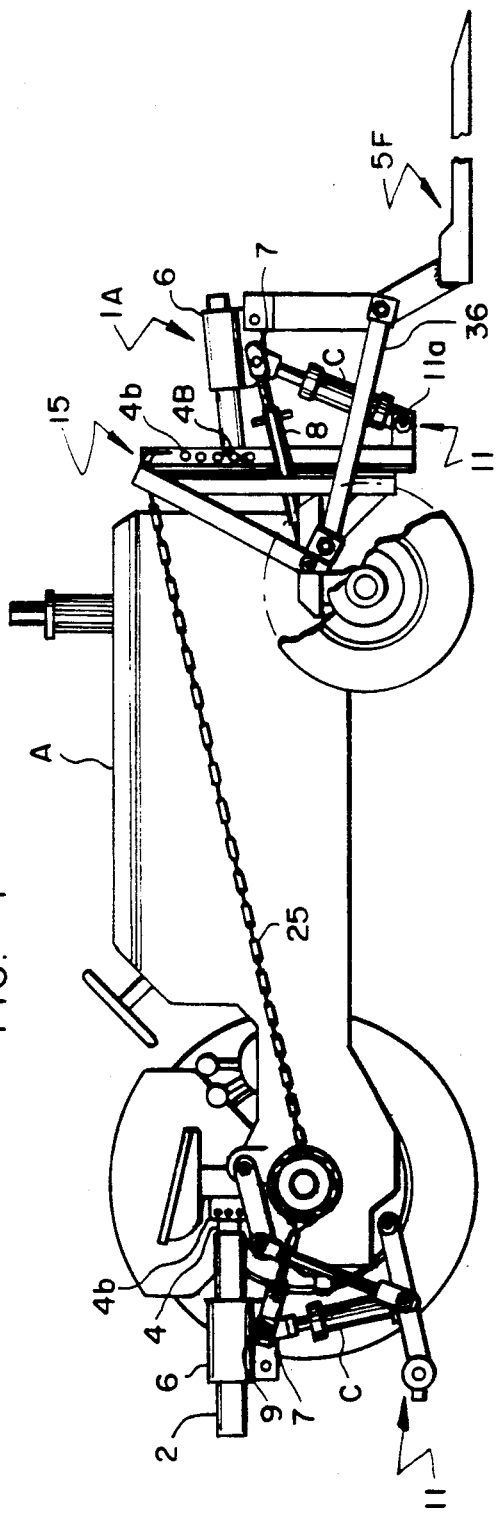
FIG. 1 depicts a cut-away side view of a tractor equipped with a front mounted attachment carrying a fork lift implement and rear mounted attachment without an attached implement.
Figure 3:
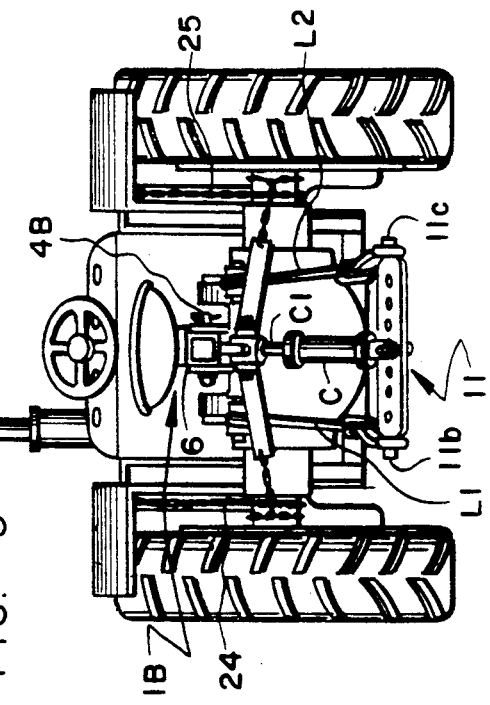
FIG. 3 is a rear view of the rear mounted attachment shown in FIG. 1.
Figure 2:
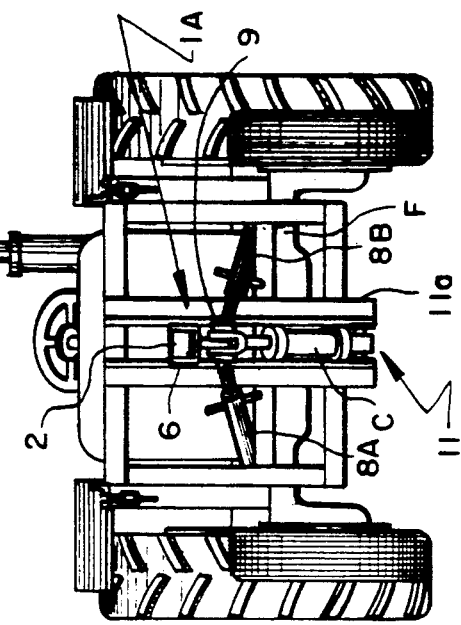
FIG. 2 is a front view of a tractor showing in part the front mounted attachment of FIG. 1.

With reference to the Figures, the present invention provides for an implement carrying attachment (generally prefixed as 1) which may be adapted for use in a tractor (designated as A) as either a rear mounted attachment carrier 1B (e.g. see FIGS. 1 and 3) or a front mounted attachment carrier 1A (e.g. see FIGS. 1-2 and 4-8) or adapted for attachment onto a tractor as both a front 1A and 1B rear mounted attachment as shown in FIG. 1. The combined use of both the front 1A and rear 1B mounted attachment may serve to double the transporting capacity of the tractor A and also help stabilize the transporting tractor A against tipping or upending. This dual capacity is especially important when the attachment 1 is used to transport large bales with a smaller transporting tractor A.

According to the present invention there is provided an attachment 1 which serves as a supportive carrier for liftable implements for transport by a transporting tractor A, said attachment 1 comprising:

A) an elongated barrel (generally designated as 2) which includes a pivotal barrel connector 4 at one barrel end for mounting the barrel onto a pivotal mounting site so as to permit the barrel 2 to radially move along an arcuate curvature about the pivotal connector 4

B) an adjustable carriage (generally designated as 6) which slideably engages and supports the barrel 2 as the barrel 2 radially moves about said arcuate curvature;

C) axial mounting means (generally prefixed as 7 and shown in the Figures as a shaft receiving aperture) for operatively connecting the carriage 6 to a reciprocating drive power source C for adjusting the barrel 2 about said arcuate curvature;

D) stabilizing means (generally designated as 8) for stabilizing the carriage 6 against lateral movement as the barrel 2 is adjusted about said arcuate curvature; and E) securing means (generally prefixed by 3) for securing the implement (generally prefixed by 5) onto carriage 6.

Figure 6:
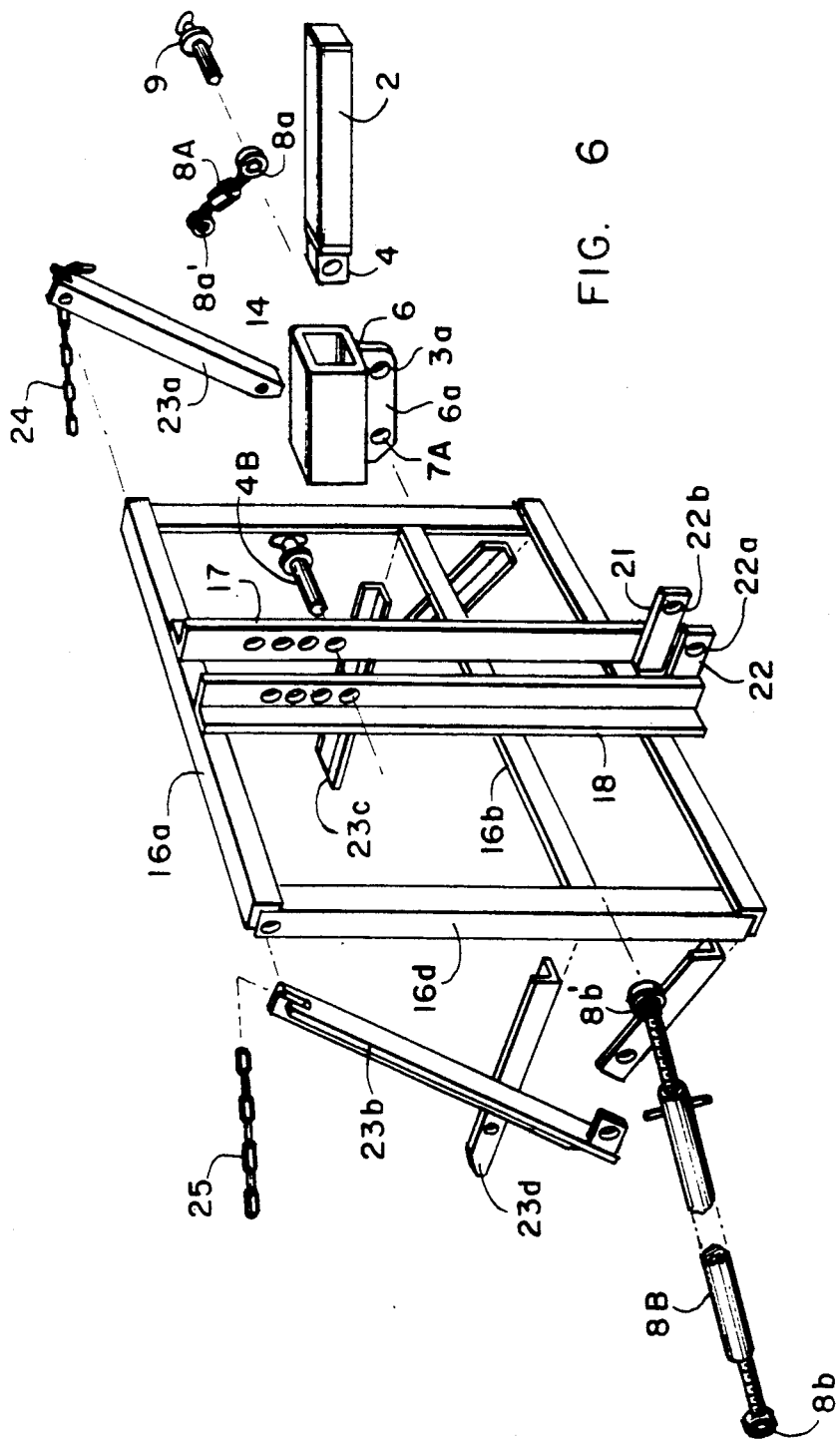
FIG. 6 shows in greater detail an unassembled view of the attachment shown in FIG. 4.

By referring to a preferred embodiment as depicted in FIG. 6, the carriage 6 includes a shaft receiving aperture 7A which serves the dual purpose of connecting the axial means to the drive source C and the stabilizing means 8 to carriage 6. Shaft 9 (shown as a hydraulic cylinder connecting pin) serves to connect aperture 7A and stabilizing means 8 to carriage 6. This permits the drive source C and the stabilizing means to axially pivot about shaft 9 as the carriage is adjusted throughout its arcuate movement. Alternatively the axial means 7 and stabilizing means 8 may, if desired, be each provided with a different carriage connective axial mounts (not shown) positioned upon the carriage 6 for their respective mounting thereto. Alternatively, carriage 6 may include a connective shaft or shafts (not shown) as the axial mounting means for connecting the drive source C and stabilizing braces 8A and 8B thereto.

The power drive source C drives carriage 6, which in turn regulates the elevational pitch of barrel 2. Other mechanical drives such as via pulleys, chains, worm gears, rack and pinions, etc. pivotally or axially mounted onto carriage 6 may be alternatively utilized to adjust carriage 6 to an appropriate elevational level or pitch. In operational use, it is advantageous for the drive source C and stabilizing braces 8A and 8B to concurrently move about fixed radial pathways as barrel 2 is adjusted along its arcuate curvature. This may be effectuated in the case of the depicted hydraulic cylinder C by axially connecting one end (e.g. the ram end $C_1$ as shown in FIG. 5) of the hydraulic cylinder to shaft 9, carriage 6, and the opposite cylinder connecting mount is connected to an axial anchoring site (generally prefixed by 11 as shown in FIG. 4) which because of its dual axial mounting allows for concurrent radial movements of hydraulic cylinder C and barrel 2 as hydraulic adjustments thereto are made. As may be observed from FIG. 2, axial movement of hydraulic cylinder C at the lower hydraulic cylinder connector occurs about connecting pin 11a; whereas, in FIG. 3 the draw bar mounts 11b and 11c serve to permit the axial movement thereabout.

Figure 10:
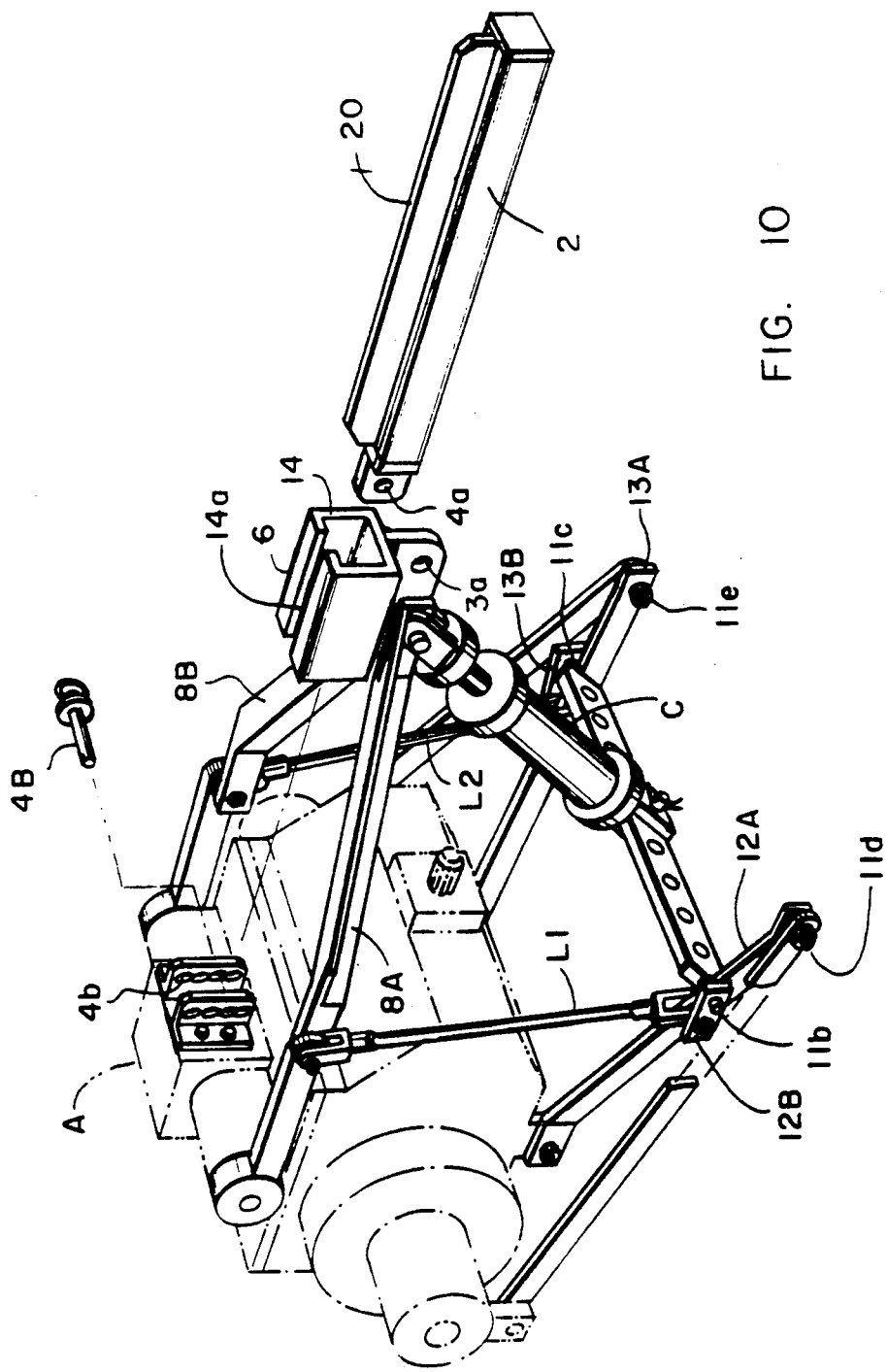
FIG. 10 depicts another embodiment of the rear mounting of the attachment onto a transporting tractor.

FIG. 10 depicts a preferred embodiment for the rear attachment 1B mounting onto the draw bar tractor lifting mechanism for purposes of shifting the gravitational center of the lifted objects towards tractor A. This enhances transporting stability. A pair of axially mounted brackets 12A and 13A are respectively connected at one bracket end to draw bar mounts 11b and 11c with the opposite bracket ends of brackets 12A and 13A being coupled to the draw bar coupling shafts 11d and 11e in combination with brackets 12B and 13B axially connected at one terminating end to shafts 11d and 11e and at another end to lifting arms L1 and L2 serve to shift the gravitational lifting center towards tractor A.

The hydraulic cylinder C is preferably positioned along a vertical bisect of the longitudinal axis of tractor A and spaced sufficiently apart from carriage 6 so as to permit ram C1, of an appropriate ram length to be extended from or withdrawn from cylinder C and thereby provide the proper elevational adjustment level for barrel 2. Tractors of an insufficient lifting capacity to lift and transport large bales when combined with hydraulic cylinder C embodiments herein may be thereby readily converted into a highly effective bale transporting carrier.

The stabilizing mean s for stabilizing the carriage 6 and the concomitant barrel 2 supported thereby may be effectively achieved by a pair of stabilizing braces 8A and 8B respectively fitted at one brace end with a carriage 6 mounting connectors 8a and 8b (as shown more specifically in FIG. 6) for axial coupling onto the carriage 6 and frame mounting connectors $8a^1$ and $8b^1$ for axially coupling onto a laterally positioned anchoring site.

Figure 7:
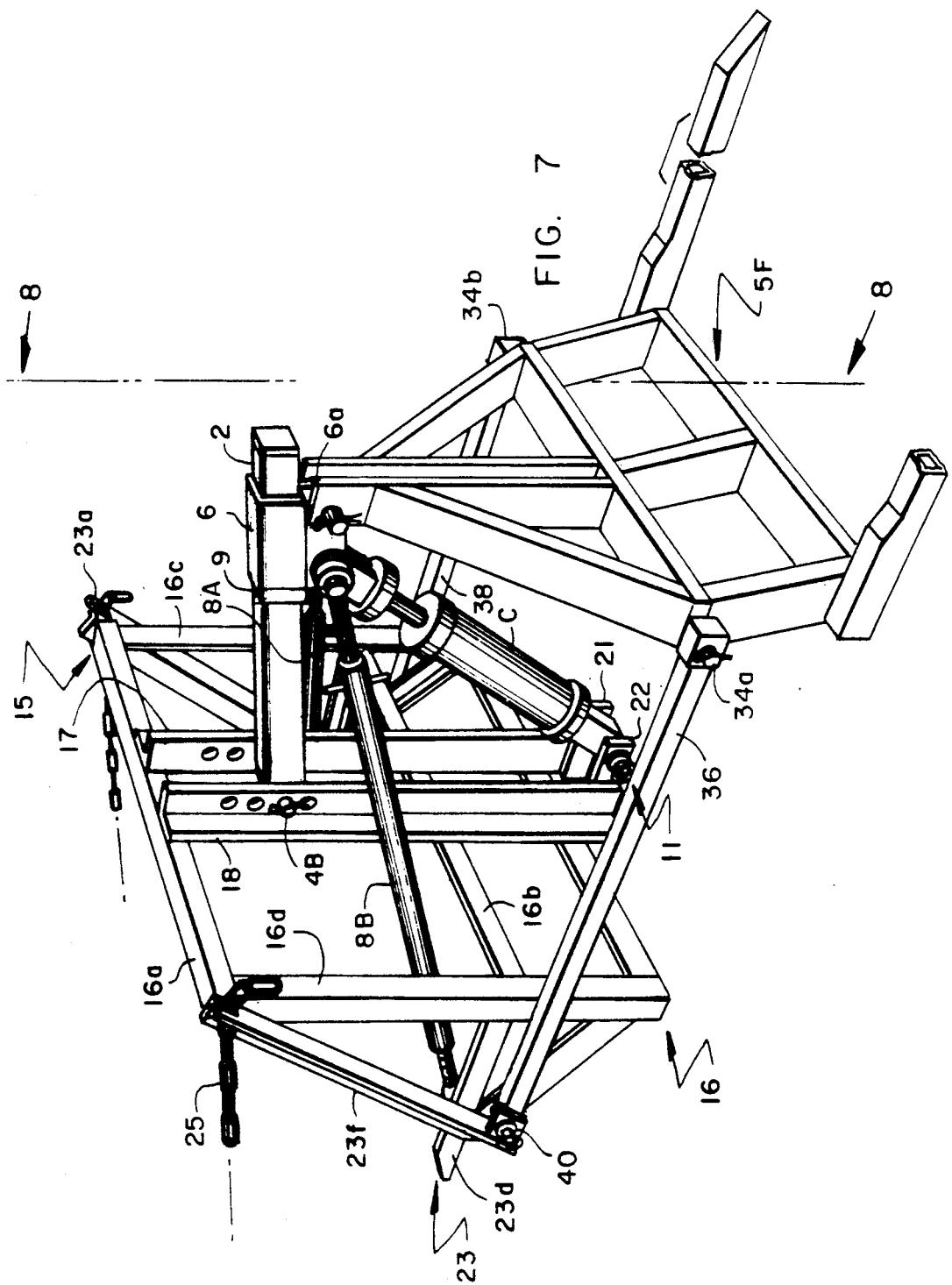
FIG. 7 is a perspective view of the front mountable attachment and attached implement shown in FIG. 1.
Figure 8:
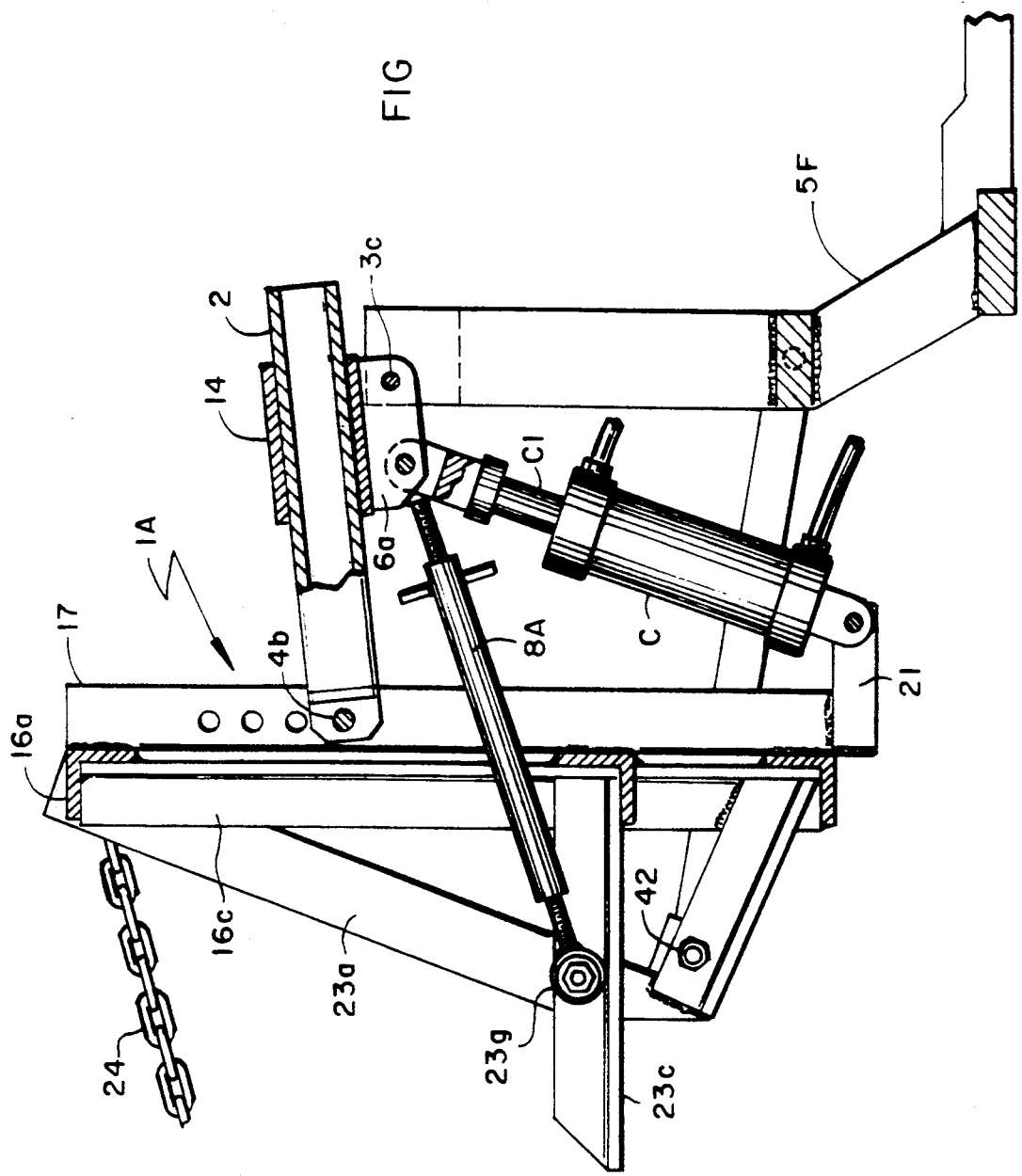
FIG. 8 is a cross-sectional view of the front mounted attachment and implement taken along line 8—8 of FIG. 7.

The mirror imaged lateral braces 8A and 8B, when operationally secured to the transporting tractor, extend laterally outwardly and rearwardly (e.g. see FIGS. 2-4, 7-8, and 10) from carriage 6 to their respective axial anchoring mounts which are spaced sufficiently apart and removed from carriage 6 so as to allow for adjustment of carriage 6 to the required variable pitch of barrel 2 and at a position sufficient to stabilize carriage 6 and barrel 2 against substantial lateral movement away from the vertical plane which vertically bisects the longitudinal axis of tractor A. Lateral braces 8A and 8B may also be provided as adjustable braces as depicted in FIGS. 7-8.

The attachment 1 is designed so that barrel 2 and carriage 6 when attached to tractor A will be substantially aligned along the bisecting vertical plane of the longitudinal axis of tractor A. As the hydraulic ram C is adjusted throughout its elevational range, carriage 6 generates a radial pathway following the plane of arcuate curvature through which barrel 2 radially moves in substantial alignment with the bisecting plane. Cylinder C, braces 8A and 8B are thus designed to concurrently and radially move about their respective axial mounts in cooperative association with the movement of the barrel 2. In the present invention, the braces 8A and 8B as well as the hydraulic cylinder C should axially allow for their respective axial movement. The carriage mounting connectors 8a and 8b, and the frame mounting connectors ($8a^1$ and $8b^1$) are depicted herein as a shaft receiving aperture but may, however, be alternatively modified to protruding shafts (not shown) for corresponding mounting of the carriage 6 and anchoring sites therefore.

When attachment 1 is properly attached to the transporting tractor A, braces 8A and 8B and the drive unit C effectively stabilize the carriage 6 and the slideably engaging barrel 2 against lateral movement. This in turn stabilizes the attached implement 5 and its load against lateral movement. Braces 8A and 8B are depicted as respectively having frame mounting connectors $8a^1$ and $8b^1$ for axially coupling braces 8A and 8B to an anchoring site disposed at opposite sides of the main axis of barrel 2. The axial mounting of connectors $8a^1$ and $8b^1$ onto the transporting tractor A is preferably positioned above the mounting position of hydraulic cylinder C. Braces 8A and 8B when mounted onto tractor A form equilateral triangular legs extending laterally outward from carriage 6. Mounted braces 8A and 8B effectively retain carriage 6 substantially along a fixed vertical plane or radial pathway as the carriage 6 is raised or lowered by hydraulic cylinder C.

In the preferred embodiments of the invention, the carriage 6 includes a barrel guide (generally designated as 14) which helps to guide and retain barrel 2 along the vertical plane of the longitudinal bisect of tractor A. Guide 14 is preferably in the form of an annular guide of a sufficient size and configuration to slideably accommodate barrel 2. A pair of guiding rims (e.g. see FIG. 10), or other appropriate guiding means may also be used for this purpose. Although the carriage 6 is preferably fitted with a guide 14 for guiding the barrel along the carriage 6, guide 14 may be eliminated by simply allowing barrel 2 to slideably interface onto carriage 6. A rod guide 14 in cooperative association with pivotal mounting of barrel 2 so as to effectively limit barrel 2 to substantially vertical movement about pivotal connector 4 further stabilizes barrel 2 against lateral pitching or movement. This cooperative association, when combined with the lateral stabilizing effect of the mounted cylinder C and the lateral brace supports 8A and 8B, optimizes the lateral stability of the attached implement.

The depicted rear mount attachment 1B is also adaptable to tractors equipped with different implement hook-up systems. For example, tractors having a fixed or horizontally adjustable draw bar may be suitably equipped with a draw bar coupling adapter (not shown) which may be secured onto the draw bar and includes an axial coupler for connecting the hydraulic cylinder C thereto.

The transporting tractor A may include an appropriate axial mounting site for axially coupling the barrel connector 4 and stabilizing braces $8a^1$ and $8b^1$ thereto. Farm tractors equipped with the three-point hitch system typically include a center link hook-up for attaching three-point implements thereto. The center-link hook-up (e.g. see FIGS. 1, 3 and 10) typically comprises a vertical channel section with a series of mating apertures 4b for axially connecting barrel 2 thereto. Barrel connector 4 may be axially mounted to the appropriate mating apertures 4b via connecting pin 4B. The center-link apertures 4b positioning (i.e. beneath the tractor seat and along the longitudinal bisect) coupled with the ability to vertically adjust barrel 2 via pin 4b to the appropriate height to match the tractor size and working conditions affords a particularly suitable mount for the pivotally mounting of barrel 2 to tractor A. However, if axial mounting sites are not present for connecting barrel connector 4 thereto, suitable axial barrel mounting connecting adapters may be fitted onto tractor A.

The depicted front mounted attachment 1A differs in several respects from conventional front mounted attachments for farm tractors. Conventional front mounted attachments typically rely upon conventional hydraulic powered front end loader accessories to power and mount farm implements thereto. In the case of a bale carrier, the bale carrier will typically unitarily and cooperatively move as a rigidly fixed spearing unit with the front end loader arm movements. In contrast, the attachment 1A herein relies upon the axial mount of barrel 2 about barrel connector 4 so as to allow the barrel 2 to axially pivot about a fixed axis. Since the front ends of conventional farm tractors are not usually equipped with a suitable connective sites for axially mounting barrel 2 thereto, the front mounted attachment 1A is modified to include a supportive frame (generally designated as 15) so as to permit barrel 2, the hydraulic cylinder C stabilizing braces 8A and 8B to be axially mounted thereto. This permits the barrel 2, stabilizing braces 8A and 8B of an appropriate length and carriage 6 (as depicted by the Figures) to be interchangeably used for both the rear mounted attachment 1A and front mounted attachment 1B.

With particular reference to FIG. 4, frame 15 is depicted as a rectangular-shaped frame portion (generally designated as 16) constructed of angle iron or other material of suitable strength. Frame portion 16 is depicted as including a top 16a, bottom 16b, and two side (16c and 16d) sections welded together at their respective cornering edges to form a rectangular shaped frame portion 16. A pair of vertically extending cross bars 17 and 18 are laterally spaced sufficiently apart along the vertical bisect of top section 16a and bottom section 16b to permit barrel 2 to be pivotally mounted thereto and radially move therebetween. Cross bars 17 and 18 also serve to structurally reinforce frame portion 16 and as an anchoring mount structure for axially connecting hydraulic cylinder C thereto. Cross bars 17 and 18 are provided with a plurality of laterally corresponding shaft apertures 4b which in conjunction with securing pin 4B serve as adjustable connecting sites for coupling the barrel connector 4 thereto. The adjustable connecting sites 4b allow for the pivotal mount of barrel 2 to be appropriately adjusted to suit the tractor type (e.g. wheel height, etc.) for operational and field conditions. Alternatively, an axial connecting site for barrel connector 4 may be provided by a pair of rearwardly or forwardly extending mounting wings (not shown) suitably equipped with shaft receiving apertures (not shown). A pair of cylinder mounting legs 21 and 22 (each respectively fitted with mating hydraulic cylinder axial connectors 22a and 22b) extend perpendicularly forwardly from the lowermost portion of cross bars 17 and 18 for axially mounting site for mounting the hydraulic cylinder C to frame 15.

Frame 15 is also equipped with a wide wheel frame mounting section (prefixed by 23) the lower portion of which is of a triangular-shape so as to matingly rest flushly against the top rail and front rail of the front axle beam (depicted as F) of a wide wheeled tractor A. Diagonal bars 23a and 23b secured (e.g. welded, bolted, etc.) onto the opposing cornering edges of top section 16a extend rearwardly and diagonally downwardly therefrom to a terminating edge disposed beneath bottom section 16b. Rearward projecting support bars 23c and 23d respectively extend perpendicularly rearward from the opposite cornering edges of bottom section 16b. Bars 23c and 23d extend beyond their intercepting juncture onto diagonal bars 23a and 23b and respectively form a pair of angle plates which ride upon the top and front rail sides of the wheel beam F. Diagonal bars 23a and 23b are each fitted with a first 23e and second 23f brace connecting sites for the axially mounting of stabilizing braces 8A and 8B thereto.

As may be observed from the Figures depicting front attachment 1A, braces 8A and 8B are shown as being bolted onto diagonal bars 23a and 23b with an internally disposed unthreaded portion of bolt 23g thereby serving as a shaft for the axially mounting braces 8A and 8B thereto. If desired, braces 8A and 8B or diagonal bars 23a and 23b may include shaft appendages (not shown) such as pin, bolt, etc. to serve as the connective site.

The front mounted attachment 1A departs from conventional implement carriers since it rides upon the axle support beam F of a wide wheeled tractor. It may be observed from the front mount attachment 1A views that diagonal bars 23a and 23b both extend below and beyond their respective intersects onto rearward projecting support bars 23c and 23d with this portion of bars 23a and 23b both including a diagonally cut so that the diagonal bars 23a and 23b in respective association to the lower interface of bars 23c and 23d thereby become aligned (at right angles) to their abutting juncture onto the wheel axle support beam F of the transporting tractor A. The portions of diagonal bars 23a and 23b which abuttingly interface onto the front rail of the axle support beam F function as a stop so as to prevent backward movement of frame 15 when an opposing force (e.g. such as arises during spearing or the transporting of a bale therewith) is applied against mounted attachment 1A. Vertical dislodgement of frame 15 is prevented by the attachment 1A weight and load which bias bars 23c and 23d firmly against the top rail interface of the beam F. This particular combination of frame 15 equipped with a frame mounting section 23 which nestles onto and rides upon the wheel axle support frame or beam F may also be adopted for the mounting other attachments (e.g. excavating and snow removal attachments, etc.) to wide wheeled transporting tractors A.

The weight of the front end mounted attachment 1A will fulcrum about the wheel axle beam F. A pair of guy chains 24 and 25 respectively secured about the rear axle of the transporting tractor A serve as anchoring guys for maintaining frame 15 in the appropriate upright position. Guy wires 24 and 25 are shown in FIGS. 1 and 7-8 as being directly attached to frame 15 via chain slots positioned at the top of diagonal bars 23a and 23b. The slots are sized so as to permit the chain to be adjusted to the appropriate tension by placing the appropriate chain link in the slot. As shown in my parent application, guy wires 24 and 25 may be connected to a pair of guy chain linking bars which are axially mounted onto the uppermost margin of side sections 16c and 16d. Such guy chain linking bars may be suitably fitted with chain connectors 28 and 29 for connecting chains 24 and 25 thereto. Other means for anchoring frame 15 and protecting it from forward dislodgement from the transporting tractor A may also be utilized for this purpose provided such anchoring means possess sufficient structural strength to retain the frame 15 in an upright position while also providing a comparable degree of flexibility as afforded by the aforementioned guy chains (24 and 25) or guy bar combination.

Barrel 2 is sufficient in structural strength (e.g. steel) to serve as a barrel for supporting the carriage 6, the implement 5 thereto and the load carried by implement 5. Tubular polygonal shaped barrels have been found to provide a high degree of structural strength while also minimizing barrel weight and affording a suitable barrel contour for slideably engaging onto barrel guide 14. Although tubular, circular and polygonal barrels of various shapes (e.g. triangular, rectangular, pentagonal, hexagonal, heptagonal, octagonal, etc.) may be utilized for this purpose, rectangular shaped barrels (preferably of a square and hollow construction) are particularly well suited for use in constructing the barrel 5 herein.

The Figures depict preferred embodiments of the barrel 2 and carriage guide 14 combination. As may be observed, particularly in FIG. 4, barrel 2 is depicted as being of a square rectangular tubular construction which interfacially mates onto cradle guide 14.

Although the barrel 2 may simply rest upon carriage 6 without any guides therefore, it is advantageous for carriage 6 to include guide 14. Carriage 6 will preferably include an enclosed guide 14 which mates onto barrel 2 as illustrated in FIGS. 1-8.

The preferred embodiments of pivotal barrel connector 4 may be observed in greater detail by referring particularly to FIGS. 4-8. Barrel connector 4 is shown as including a steel insert 4A welded onto barrel 2 which helps to maintain barrel 2 at fixed and proper orientation when coupled to its pivotal mount.

FIG. 10 depicts an alternative cradle design in which cradle 14 includes a slotted portion 14a through which a reinforcing rib 20 of barrel 2 slides. The top slotted portion 14a and rib 2a serve to guide and maintain proper orientation of barrel 2.

The attachments 1 of this invention provide an effective implement carrying attachment which may be adapted for use upon transporting tractors generally equipped with a hydraulic power source. In operation, the attached attachment 1 is simply adjusted via hydraulic cylinder C to the appropriate working position. Since both the front 1A and rear mounted attachments 1B may be placed in close proximity as to the transporting tractor A as depicted in the Figures, the implement 5 and its load weight are operatively positioned for optimum stability during transport. The front mounted attachment 1A is also designed so to further optimize the gravitational stability of the transporting tractor. The front end attachment 1A allows for a more complete vertical lifting of a load so as to assure load positioning as close to the carrier as possible to insure optimum transport safety and effectiveness. The transported weights are accordingly effectively carried by the implements as close to the tractor's center of gravity as possible. These features when combined with the lateral stability afforded by the present attachments 1 significantly enhance the overall stability and safety thereof.

The carriage 6 also includes securing means 3 for securing a variety of lifting implements 5 onto the front 1A and rear 1B attachments. A wide variety of attachable implements 5 (e.g. booms, subsurfacers, large bale spear, fork lifts, buckets and scoops, earth and snow plows, planters, cultivators, snowblowers, etc.) may be attached to attachments 1A and 1B with the attachments 1 herein being particularly useful for those implements 5 which operationally require a lifting system. The carriage member 6 as used in the front attachment 1A will advantageously embody the same or substantially the same securing means 3 used for coupling the implement 5 onto carriage member 6 of the rear attachment 1B. This will generally permit the implement 5 to be interchangeably coupled to either the front 1A or rear 1B attachment.

As illustrated in FIGS. 1 and 4-10, carriage 6 is supported by a heavy plate metal section 6a which serves a rigid support for connecting the power drive source C and lateral braces 8A and 8B onto carriage as well as the securing means 3 for coupling the implement 5 onto the carriage 6. By coupling implement 5 onto carriage 6, the elevational pitch of implement 5 may be suitably adjusted by lowering or raising the carriage 6 with the reciprocating drive power source c. Support plate 6a may be suitably provided with a forwardly disposed mounting aperture 3a which permits a mating apertured unit 3b of implement 5 to be simply attached or detached thereupon by pin 3c.

The preferred means 3 for securing the implement 5 may be more fully appreciated by referring to the FIGS. 7-8 which illustrate a conventional fork lift implement 5F (three point hitch type) coupled onto carriage 6 by securing pin 3c. The fork lift 5F is depicted as including a conventional top link of three-point hitch of a configuration which mates onto aperture 3a of plate 6a for coupling together by pin 3c. The lower three point hitch connectors (pins 34a and 34b) of fork lift F are axially connected onto stabilizing arms 36 and 38 which in turn are axially connected to support arm frame connectors 40 and 42.

Figure 9:
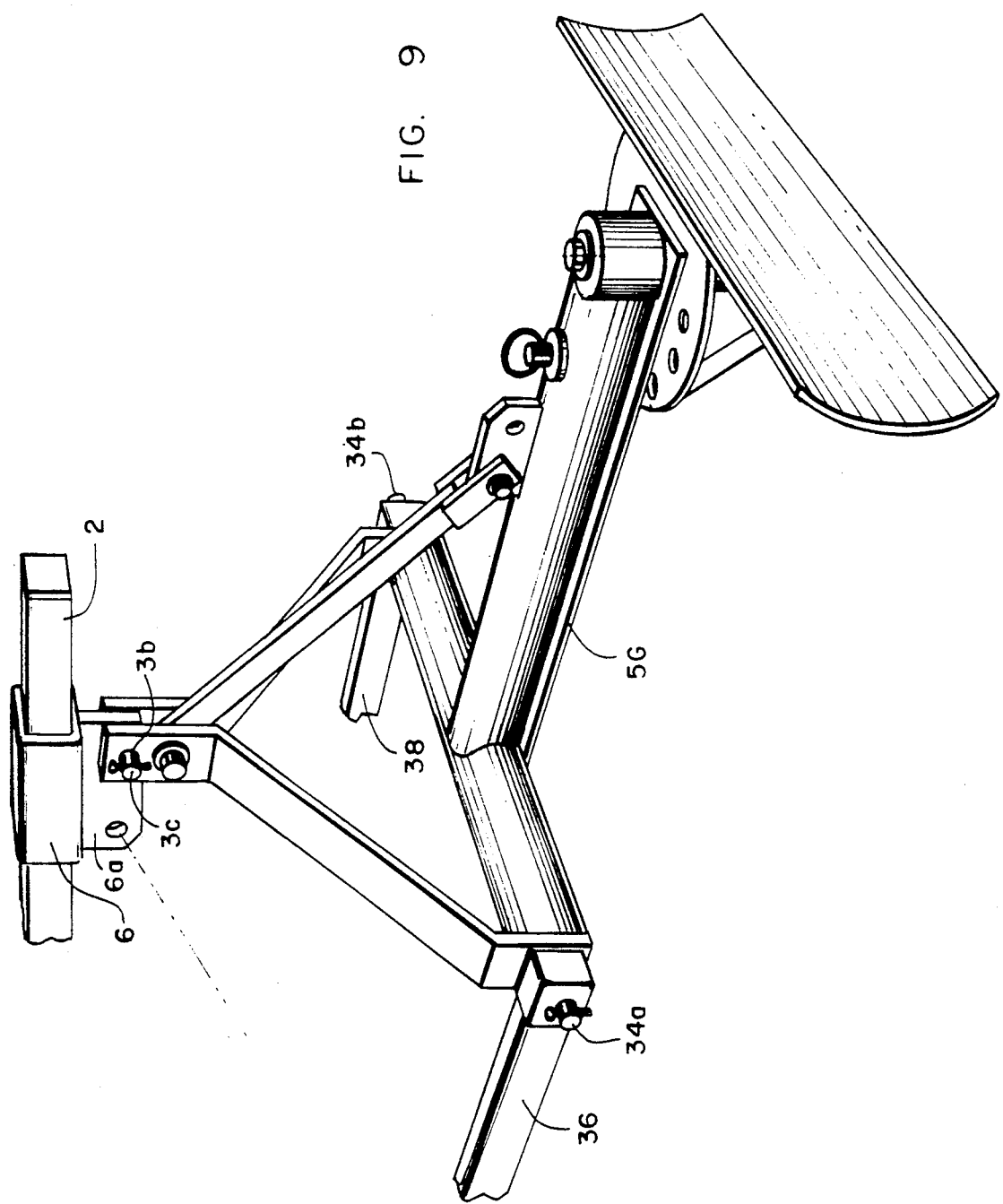
FIG. 9 depicts in part the mounting of a bladed implement onto the three point hitch connective linkages for either the front or rear mounted attachment of FIG. 1.

In FIGS. 8 and 9, stabilizing arms 36 and 38 are shown respectively as being axially connected at one end to fork connectors 34a and 34b and at the other end onto axial frame connecting members 40 and 42 respectively of diagonal bars 23a and 23b. The stabilizing arms 36 and 38 provide the connecting linkage for the lower two point coupling pins of three point hitch implements such as the grader 5G depicted in FIG. 9 and the fork lift 5F in FIG. 7. The three point hook-up of the fork lift 5F may be accomplished simply by either backing the rear attachment 1B onto or driving the forward attachment 1A forward to the three point coupling system and adjusting the hydraulic cylinder C so that mounting aperture 3a of plate 6a aligns onto the mating mounting apertures of fork lift implement 5F so as to permit pin 3c to be secured therein and thereby axially secure the fork lift implement 5F onto carriage 6. The stabilizing arms 36 and 38 are also secured onto coupling pins 34a and 34b of the fork lift implement 5F.

FIG. 9 depicts a conventional implement grader 5G with an adjustable blade and a three point hitch hook so as to similarly attach and detach from the carriage 6 of the rear 1B and front 1A attachments as the fork lift 5F implement. The grader 5G of FIG. 9 similarly depicts in part the stabilizing arms 36 and 38 axially mounted to pin connectors 34a and 34b with pin 3c coupling of the upper three point hitch of the implement grader 5G onto plate 6a via aperture 3a of carriage 6.

As may be further observed from the drawings, the front 1A and rear 1B attachments embody three point hitch capability which renders the attachment 1 particularly suitable for use in combination with those implements of a three point hitch type. With particular reference to the three point hitch depicted by FIG. 7, the connective linkage onto carriage 6 (e.g. stabilizing braces 8A and 8B, top hydraulic ram yoke and the slideable carriage member 6) form the upper linking point of a three point hitch while the axially mounted stabilizing arms 36 and 38 form the remaining or lower linking points of a three point hitch hook-up. This permits the attachment 1 of this invention to be readily adapted to categories 1 and 2 implements.

What is claimed is:

1. An attachment which serves as a supportive carrier for an attachable implement for use in combination with a transporting tractor, said attachment comprising:

A) an elongated barrel which includes a pivotal barrel connector at one barrel end for mounting the barrel to a pivotal mounting site so as to permit the barrel to radially pivot about said pivotal connector;

B) an adjustable carriage, member which slideably reciprocates along and carries said barrel and serves to raise and lower said barrel as the carriage member reciprocates along said barrel;

C) axial mounting means for connecting the carriage member to a power drive source so as to permit the drive source to axially pivot about said axial mounting means;

D) stabilizing means axially mounted onto said carriage member for stabilizing said carriage member against lateral movement as the carriage member reciprocates along said barrel; and E) securing means for attaching the implement onto the carriage member.

2. The attachment according to claim 1 wherein the stabilizing means comprises a first lateral support brace and a second lateral support brace with said first brace and said second brace being respectively fitted with a first axial connector for axially mounting said first brace and said second brace onto the carriage member and a second brace connector for pivotally mounting said first brace and said second brace onto fixed mounting sites laterally spaced sufficiently apart so as to stabilize the carriage member against lateral movement.

3. The attachment according to claim 1 wherein the barrel comprises a tubular barrel.

4. The attachment according to claim 3 wherein the carriage member includes a contoured configuration for slideably mating onto said barrel.

5. The attachment according to claim 1 wherein the securing means comprises connective linkages for attaching a three point hitch implement onto said attachment.

6. The attachment according to claim 3 wherein the carriage member includes a sleeved portion for enveloping said barrel.

7. The attachment according to claim 1 wherein the carriage member includes at least one shaft receiving aperture for axially connecting the axial mounting means and the stabilizing means to the carriage member and an implement connective linkage for attaching the implement to said carriage member.

8. The attachment according to claim 7 wherein the stabilizing means includes a first lateral support brace and a second lateral support brace respectively fitted with a carriage member connector at one brace end for axially connecting said first and said second lateral support braces to the aperture and a terminal connector for axially mounting an opposite brace end of said first brace and said second brace respectively onto a first lateral axle mounting site and an oppositely positioned second lateral axle mounting site.

9. The attachment according to claim 8 wherein the attachment includes a support frame having a wheel axle support beam engaging unit for placement of the frame onto a wheel axle support beam of a wide wheeled front axled tractor, a rearward movement stop for stopping the rearward movement of said frame upon said support beam, the pivotal mounting site connecting the pivotal barrel connector to the frame, the first lateral axle mounting site and the second lateral axle mounting site laterally positioned sufficiently apart upon said frame so as to stabilize the carriage member against lateral movement and a power drive axle connector mounted upon said frame at a position in substantial vertical alignment to said pivotal mounting site for axially coupling the power drive source onto said frame, and anchoring means for anchoring the frame onto a rear axle of the tractor.

10. An attachment which serves as a carrier for a liftable implement when mounted onto a transporting tractor, said attachment comprising an elongated barrel terminated at one barrel end by a pivotal barrel connector so as to permit pivotal movement of said barrel about said barrel connector, two laterally extending braces respectively equipped with axial brace connectors at opposite brace ends so as to allow for pivotal movement of said braces about said axle brace connectors while also concurrently stabilizing said braces against lateral displacement, and a carriage member which slideably engages said barrel and serves as an adjustable weight bearing carrier for said barrel, with said carriage member further including an axial drive connector for axially connecting a drive unit onto the carriage member so as to thereby afford a drive means for adjusting the carriage member to an appropriate elevational pitch when said carriage member is connected to said drive means, an axial mount for axially mounting the braces onto said carriage member, and securing means for attaching an implement onto said carriage member.

11. The attachment according to claim 10 wherein the carriage member includes a supportive base plate equipped with an implement mounting aperture for attaching the implement onto said carriage member.

12. The attachment according to claim 11 wherein the attachment includes a first lateral axle mounting site and a second lateral axle mounting site laterally positioned sufficiently apart upon said attachment so as to stabilize the carriage member against lateral displacement when said axial brace connectors are axially connected to said first lateral axle mounting site, said second lateral axle mounting site and said carriage member.

13. The attachment according to claim 10 wherein said barrel and said carriage are positionally aligned within said attachment so as to form a bisecting vertical plane of a longitudinal axis of said tractor when said attachment is operationally attached onto said tractor.

14. The attachment according to claim 10 wherein said laterally extending braces are axially mounted onto the carriage member at a common carriage mounting site and said braces laterally extend outwardly therefrom.

15. A front-end mountable attachment adapted for mounting a liftable implement onto a transporting tractor, said attachment comprising an elongated barrel terminated at one barrel end by a pivotal barrel connector so as to permit pivotal movement of said barrel about said barrel connector, two lateral braces respectively equipped with axle brace connectors at opposite brace ends so as to allow for pivotal movement of said braces about said axle brace connectors, a carriage member which slideably engages said barrel and serves as an adjustable weight bearing carrier for said barrel, with said carriage member further including an axial drive connector for axially connecting a drive unit onto the carriage member so as to thereby afford a drive means for adjusting the carriage member to an appropriate elevational pitch when said carriage member is connected to said drive means, an axial mount for axially mounting the braces onto said carriage member, and a front support frame having a wheel axle support beam engaging unit for placement of the frame onto a front wheel axle support beam of a wide wheeled front axled tractor, a rearward movement stop for stopping the rearward movement of said frame upon said support beam, a pivotal barrel mounting site for connecting the pivotal barrel connector to the frame, a first lateral axle mounting site and a second lateral axle mounting site laterally positioned sufficiently apart upon said frame so as to stabilize the carriage member against lateral movement when said axial brace connectors are axially connected to said first lateral axle mounting site, said second lateral axial mounting site and said carriage member, power drive axle connector mounted upon said frame at a position in substantial vertical alignment to said pivotal barrel mounting site for axially coupling the drive means onto said frame and securing means for attaching the implement onto said attachment.

16. The attachment according to claim 15 wherein the securing means includes connective linkages for attaching a three point hitch implement onto said attachment.

17. The attachment according to claim 16 wherein the carriage member includes a downward extending plate equipped with an implement mounting aperture for mounting an upper connective linkage of the three point hitch implement thereto.

18. The attachment according to claim 15 wherein the securing means includes an implement connective linkage carried by said carriage member.

19. The attachment according to claim 15 wherein the securing means comprises connective linkages for attaching a three point hitch implement onto said attachment with said connective linkages including an upper implement connective linkage carried by the carriage member and a pair of lower implement connective linkages separately associated with a pair of axially mounted support arms which extend outwardly from said frame and which are respectively fitted with a lower implement connector for axially connecting the implement thereto.

* * * * *